Dec. 4, 1928.  
C. BLESSMAN, JR  
1,693,884  
REEL FOR CONDUCTING CORDS  
Filed March 11, 1926  
2 Sheets-Sheet 1
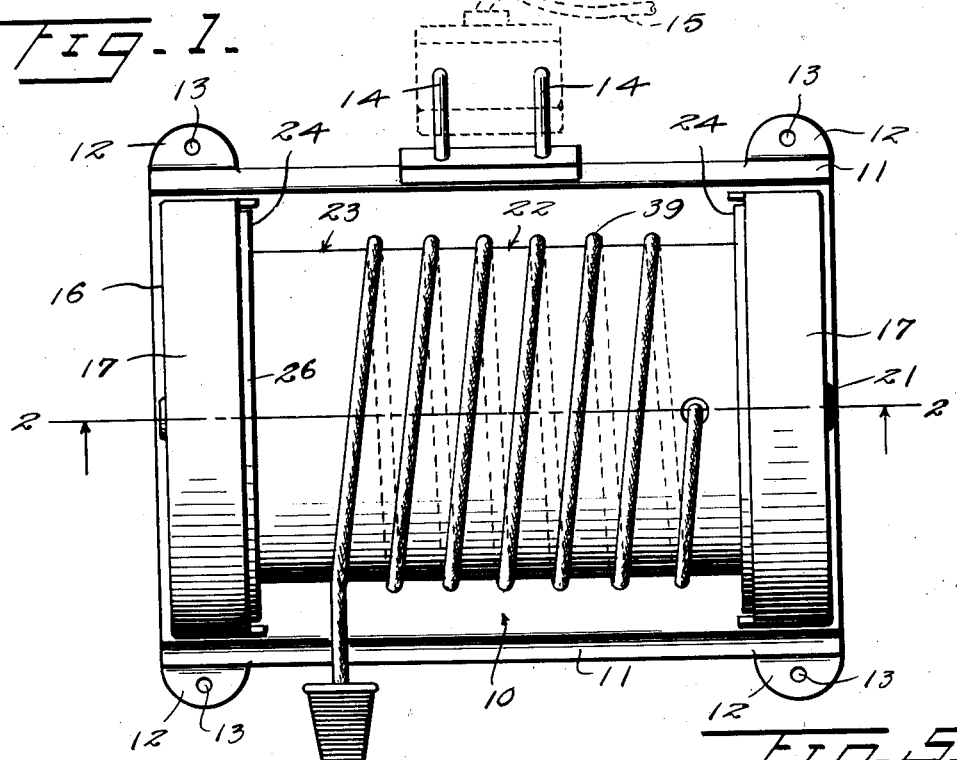
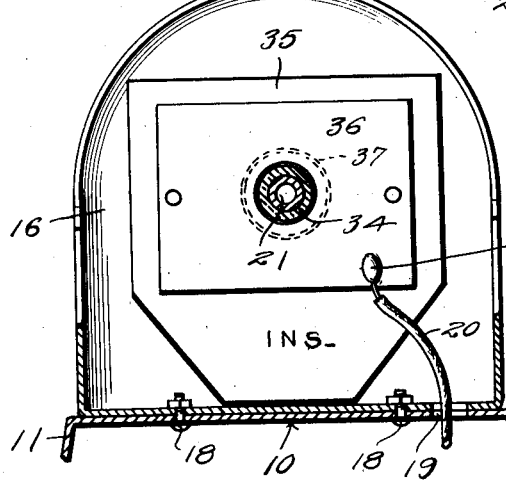
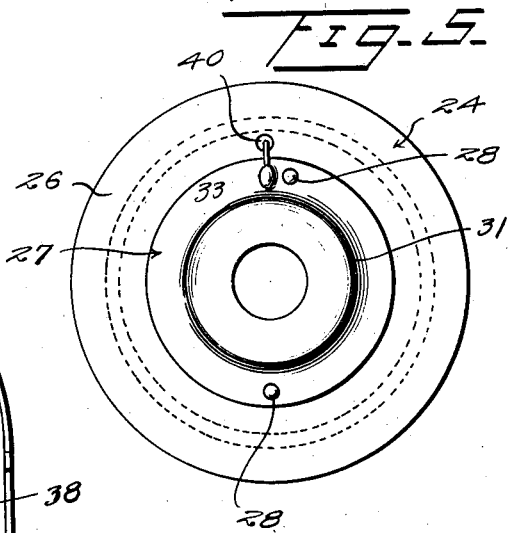
Inventor  
*Charles Blessman, Jr.*  
By *Watson E. Coleman*  
Attorney Dec. 4, 1928.
C. BLESSMAN, JR
REEL FOR CONDUCTING CORDS
Filed March 11, 1926
1,693,884
2 Sheets-Sheet 2
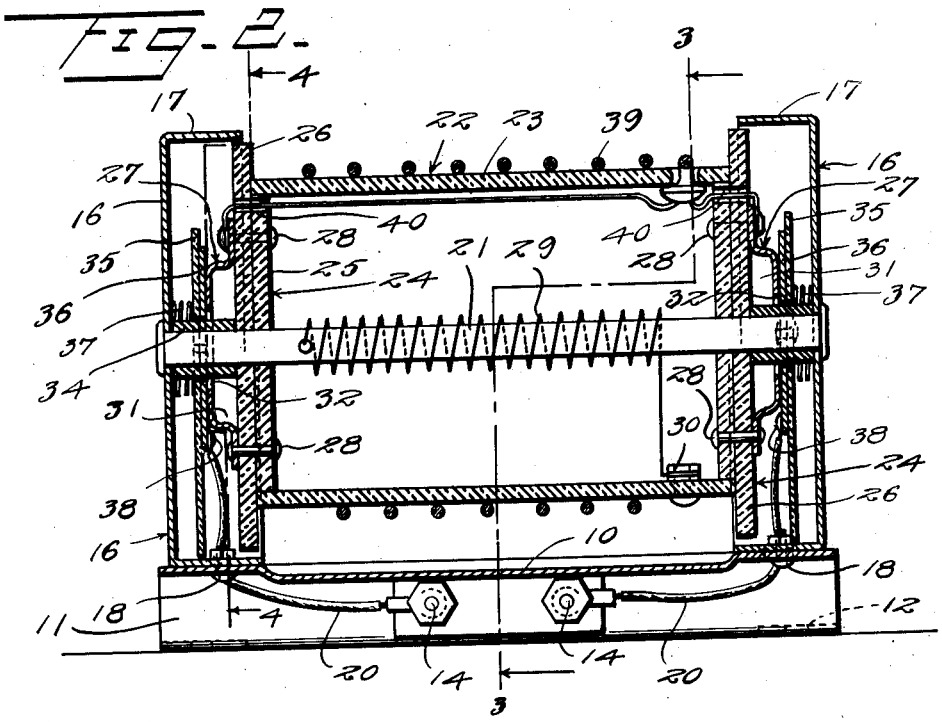
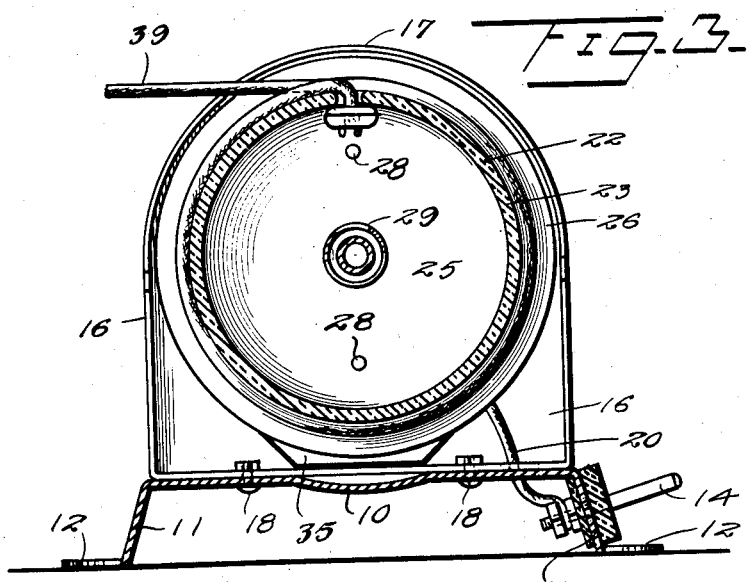
Inventor
Charles Blessman, Jr.
By Watson E. Coleman
Attorney Patented Dec. 4, 1928.

1,693,884

UNITED STATES PATENT OFFICE.

CHARLES BLESSMAN, JR., OF TOLEDO, OHIO, ASSIGNOR TO THE REEL NOVELTY MFG. CO., OF TOLEDO, OHIO, A CORPORATION OF OHIO.

REEL FOR CONDUCTING CORDS.

Application filed March 11, 1926. Serial No. 94,029.

This invention relates to improvements in reels for conducting cords and more particularly to an improvement of the reel structure shown in Patent, No. 1,464,631, granted August 14, 1923, to Fred J. Spuehler, for reel for conducting cords.

A further and more specific object of the invention is to provide novel and improved means for establishing connections between the cord applied to the reel and a source of current.

A further object of the invention is to provide a structure of this character which may be very readily assembled and which is neat in its appearance.

A still further object of the invention is to provide a device of this character which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view of a reel for conducting cords constructed in accordance with my invention;

Figure 2 is a vertical sectional view therethrough on the line 2—2 of Figure 1;

Figure 3 is a section on the line 3—3 of Figure 2;

Figure 4 is a section on the line 4—4 of Figure 2;

Figure 5 is an end elevation of the reel.

Referring now more particularly to the drawings, the numeral 10 generally designates a base, the side edges of which are downbent to provide supporting walls 11 having at their lower ends out-turned feet 12 perforated for the reception of securing elements, as indicated at 13. One side wall 11 has suitably mounted thereon at its inner face a pair of binding posts 14, the outer ends of which are continued beyond the outer face of the wall 11 to provide conducting pins for engagement with a cord 15 leading to a suitable source of current. Arising from opposite ends of the base 10 are end members 16, each having an angular flange 17 which, at the lower end of the end member, is suitably secured to the base 10, as indicated at 18. The base 10 and flange 18 at the engaged portions thereof have aligned openings 19 for the passage of conducting wires 20 forming leads from the binding posts 14. Each end member 16 has engagement with one end of a shaft 21 in such fashion that the shaft is held against rotation. Rotatably mounted upon this shaft is a drum 22 consisting of a cylinder 23 and end members 24, each comprising two disks 25 and 26, the disk 25 being of the same internal diameter as the cylinder 23 while the disk 26 is of greater diameter than such cylinder. The end members are glued or otherwise secured to the cylinder and the disks of the end members are held in assembled relation to one another and to a contact element 27 co-axial therewith and arranged upon the outer faces thereof by rivets 28 or the like. The shaft 21 intermediate the end members 24 has secured thereto one end of a coil spring 29 which is loosely wound about the shaft and has its opposite ends secured to the drum 22, as at 30.

The contact element 27 hereinbefore mentioned includes a cup-shaped body 31, the bottom of which has an opening 32 of greater size than the shaft 21 and this bottom is spaced from the adjacent face of the end member 16 when the drum 22 is centrally located upon the shaft. The rim of the cup-shaped member has a flange 33 through which the rivets 28 are directed. Surrounding the shaft between each end member 24 of the drum 22 and the end member 16 of the base is an insulating sleeve 34. A fiber plate 35 is provided having an opening of the same size as the external diameter of the sleeve and the inner face of this fiber plate has secured thereto a copper plate 36 which is held in engagement with the face of the contact element 27 by a spring 37 extending between the fiber plate 35 and the adjacent face of the end member 16. This spring constantly maintains a contact between the contact elements formed by the copper plate 36 and member 27. Each lead 20 is soldered or otherwise secured to the copper plate 36, as at 38. The wall of the cylinder 23 has an opening through which a two-wire conducting cord 39 may be led and within the drum, this cord has its wires separated and led through openings 40 in the end members 24 of the drum and electrically secured to the contact elements 27. It will be obvious that by giving the upper end of the end members 16 the proper conformation, the flanges 17 thereof at such upper ends will have close engagement with the peripheries of the disk 26 of the end members 24 so that an effective seal is provided, preventing entrance of anything which may cause short circuiting of the contact elements 27 or 36 with the frame.

It will also be obvious that a structure of this character may be very readily and cheaply assembled and will be durable and efficient in service.

Since this structure is obviously capable of a certain range of change and modification without materially departing from the spirit of the invention, I do not limit myself to such specific structure except as hereinafter claimed.

I claim:—

In a reel for conducting cords, a base, a pair of end members arising therefrom, a stationary shaft supported by the end members, a hollow drum rotatable upon the shaft intermediate the end members, a spring connecting the shaft and drum and tending to constantly urge the drum in one direction, a circular contact element carried by each end of the drum and spaced from the shaft, a cord wound upon the drum and including conducting wires respectively connected to the contact elements at the ends of the drum, contact elements surrounding the shaft at the ends of the drum in confronting relation to the contact elements of the drum, insulating plates likewise surrounding the shaft and arranged outwardly of the last named contact elements, springs extending between the end members and the insulating plates and constantly urging the last named contact elements into engagement with the contact elements of the drum and sleeves surrounding the ends of the shaft between the ends of the drum and the end members holding the drum against longitudinal displacement upon the shaft and insulating said contact elements from the shaft.

In testimony whereof I hereunto affix my signature.

CHARLES BLESSMAN, Jr.